(12) United States Patent
Yang et al.

(10) Patent No.: US 11,042,231 B2
(45) Date of Patent: Jun. 22, 2021

(54) STYLUS STRUCTURE FOR TRANSMITTING A COLOR SIGNAL

(71) Applicant: Waltop International Corporation, Hsinchu (TW)

(72) Inventors: Teng-Fa Yang, New Taipei (TW); Chia-Jui Yeh, Hsinchu (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days.

(21) Appl. No.: 16/812,413

(22) Filed: Mar. 9, 2020

(65) Prior Publication Data
US 2021/0124437 A1    Apr. 29, 2021

(30) Foreign Application Priority Data
Oct. 28, 2019    (TW) .................................. 108138817

(51) Int. Cl.
*G06F 3/0354* (2013.01)
*G06F 3/041* (2006.01)
*G06F 3/039* (2013.01)

(52) U.S. Cl.
CPC .......... *G06F 3/03545* (2013.01); *G06F 3/039* (2013.01); *G06F 3/04162* (2019.05)

(58) Field of Classification Search
CPC .................................................. G06F 3/03545
USPC ......................................................... 345/179
See application file for complete search history.

(56) References Cited

U.S. PATENT DOCUMENTS

2006/0027958 A1* 2/2006 Lapstun ........... G06K 19/06037
270/1.01
2019/0369859 A1* 12/2019 McClean ........... G06K 9/00416

\* cited by examiner

*Primary Examiner* — Long D Pham
(74) *Attorney, Agent, or Firm* — Li & Cai Intellectual Property (USA) Office

(57) ABSTRACT

A stylus structure includes a main body module, a control module, a modulation module, and a cover module. The main body module includes a stylus case unit and a movable unit. The control module includes a process unit and a transmission unit. The modulation module includes multiple sensing units. The cover module includes a stylus cover unit and multiple button units. When an outer opening of the movable unit corresponds to an inner opening of the stylus case unit and the transmission unit electrically connects an external power supply terminal, the transmission unit transmits power from the external power supply terminal to the process unit. When the sensing unit is pressed against a corresponding button unit, a sensing signal is generated by the sensing unit and transmitted to the process unit. The process unit according to the sensing signal sends a color signal to an external electronic device.

10 Claims, 14 Drawing Sheets

STYLUS STRUCTURE FOR TRANSMITTING A COLOR SIGNAL

CROSS-REFERENCE TO RELATED PATENT APPLICATION

This application claims the benefit of priority to Taiwan Patent Application No. 108138817, filed on Oct. 28, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a stylus structure and more particularly to a stylus structure with a color switching function.

BACKGROUND OF THE DISCLOSURE

There are many methods that can be used to operate a touch panel, the most common one of which is to touch or slide a finger or a stylus on a surface of the touch panel so that a sensor inside the touch panel generates corresponding signals. However, in the related art, when a user operates the touch panel with the stylus, if a color of the line to be drawn requires changing, the user would need to switch the color through the settings on an operation interface of the touch panel, which may result in inconveniences for the user.

SUMMARY OF THE DISCLOSURE

In response to the above-referenced technical inadequacies, the present disclosure provides a stylus structure.

In one aspect, the present disclosure provides a stylus structure including a main body module, a control module, a modulation module, and a cover module. The main body module includes a stylus case unit and a movable unit. In which, an accommodating space is formed inside the stylus case unit, an inner opening being in spatial communication with the accommodating space is formed on a body of the stylus case unit, a touch control member is disposed at an end of the stylus case unit, and a supportive part is disposed at another end of the stylus case unit. The movable unit is movably sleeved on the stylus case unit, in which an outer opening is formed on the movable unit, and the inner opening is exposed from the outer opening or covered by the movable unit through a rotation of the movable unit. The control module is located in the accommodating space and includes a process unit and a transmission unit, in which the process unit is communicatively connected to at least one external electronic device, and the transmission unit is electrically connected to the process unit and corresponds to the inner opening. An end of the modulation module is electrically connected to the process unit, and another end of the modulation module is sleeved on the supportive part and includes a plurality of sensing units. The cover module includes a stylus cover unit and a plurality of button units. The stylus cover unit is detachably sleeved on the stylus case unit and has a plurality of through holes through a body of the stylus cover unit. Each one of the button units is movably disposed to a corresponding through hole, and the plurality of button units correspond to the plurality of sensing units. When the outer opening corresponds to the inner opening and the transmission unit is electrically connected to an external power supply terminal, the transmission unit transmits an electrical power supplied by the external power supply terminal to the process unit. In addition, when one of the button units is pressed against a corresponding sensing unit, the corresponding sensing unit generates a sensing signal and transmits the sensing signal to the process unit. According to the sensing signal, a color signal is sent to at least one of the external electronic devices by the process unit.

Therefore, one of the beneficial effects of the present disclosure is that the stylus structure provided in the present disclosure can achieve a color switching function through the foregoing aspects.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
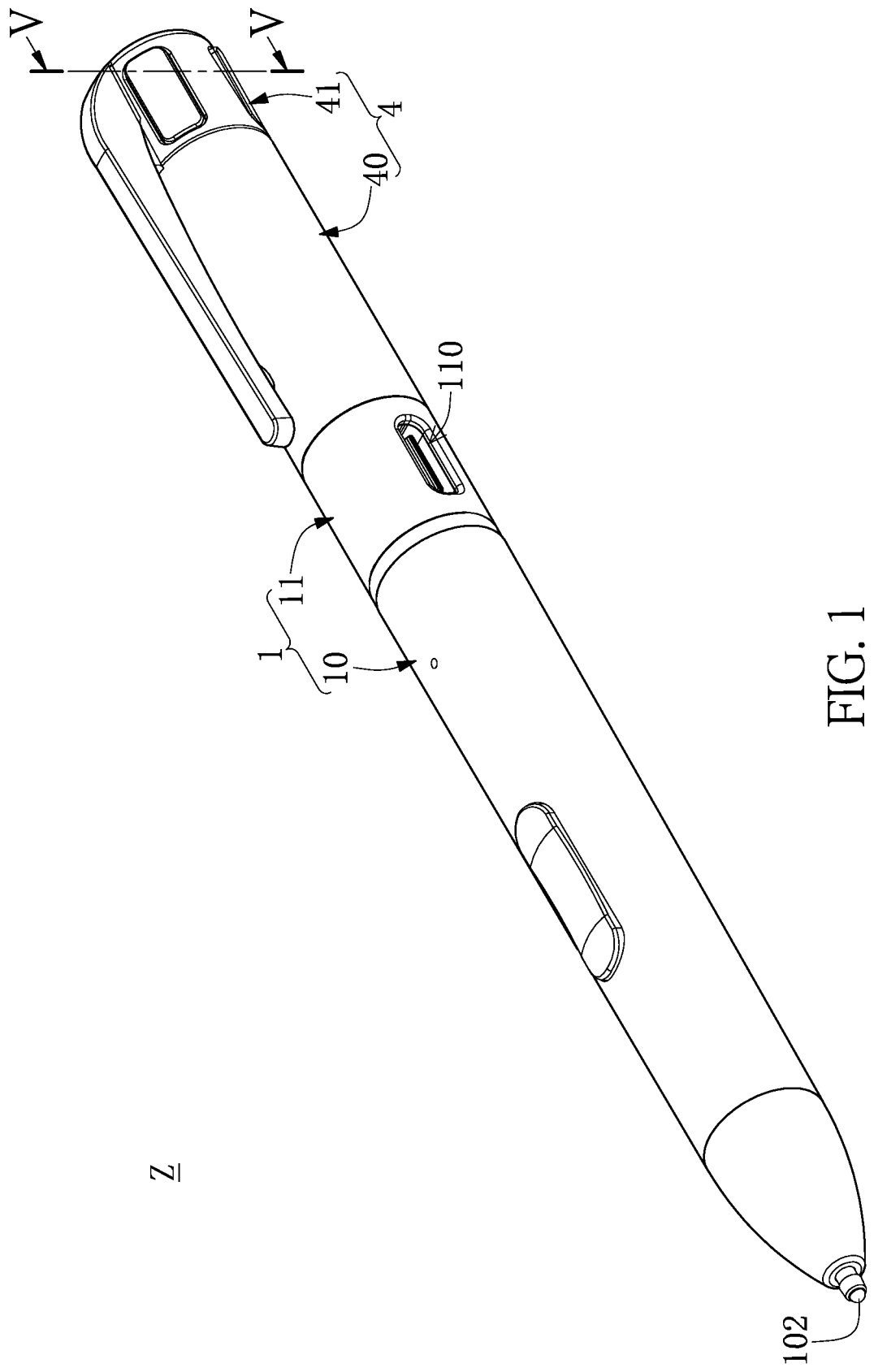
FIG. 1 is a first perspective view of a stylus structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
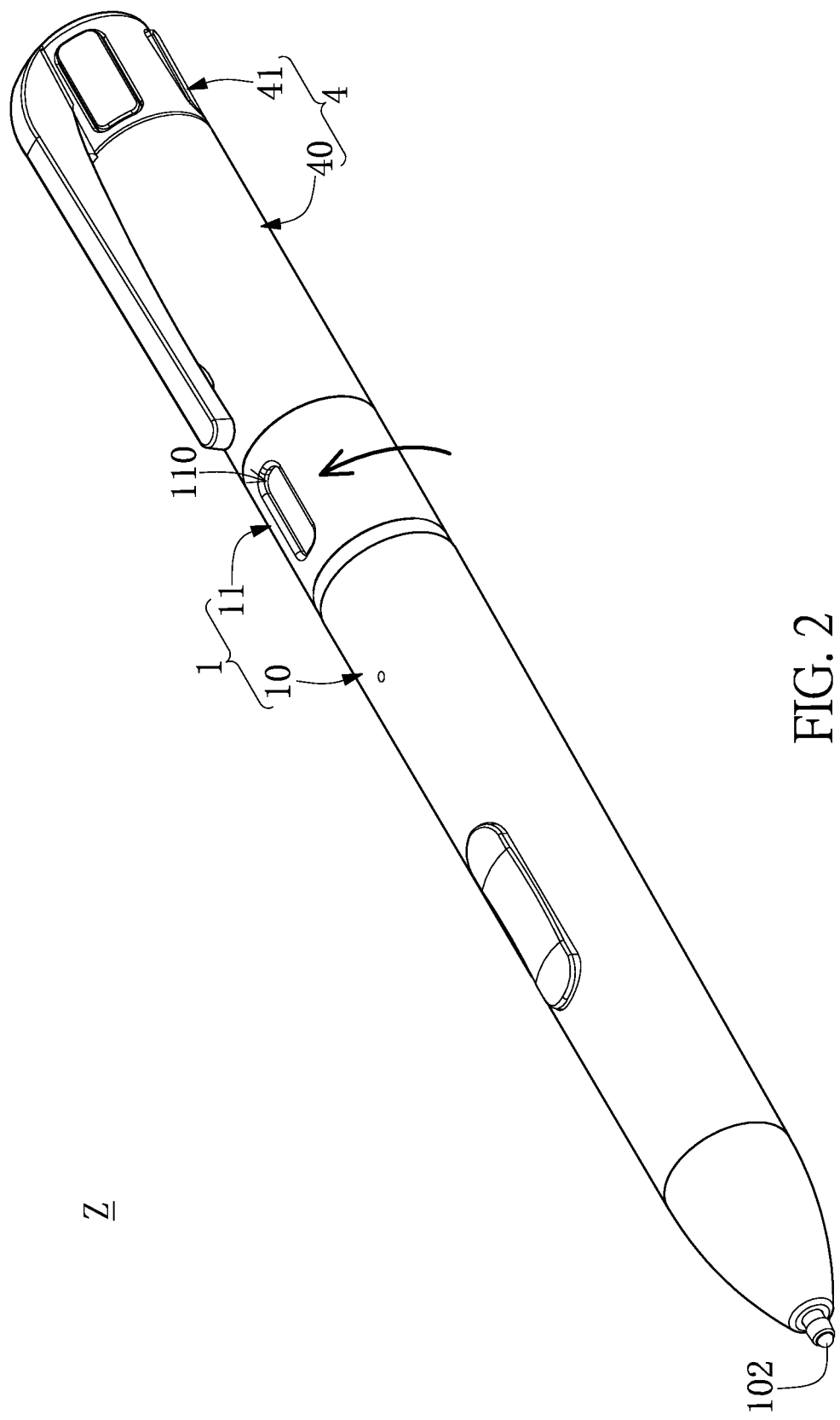
FIG. 2 is a second perspective view of the stylus structure according to the first embodiment of the present disclosure.
Figure 3:
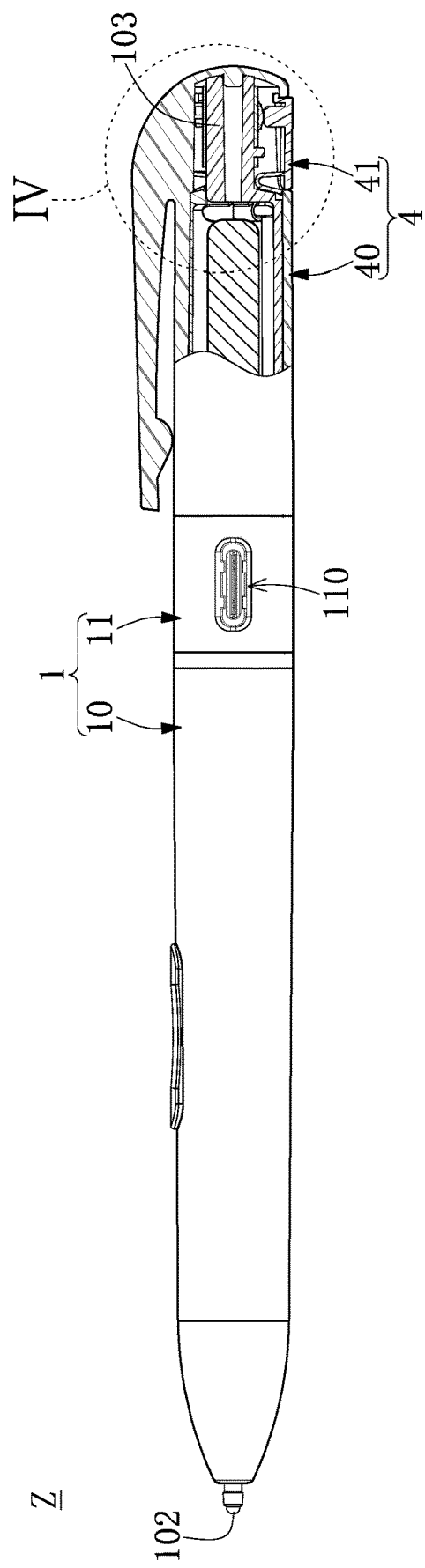
FIG. 3 is a partial sectional view of the stylus structure according to the first embodiment of the present disclosure.
Figure 4:
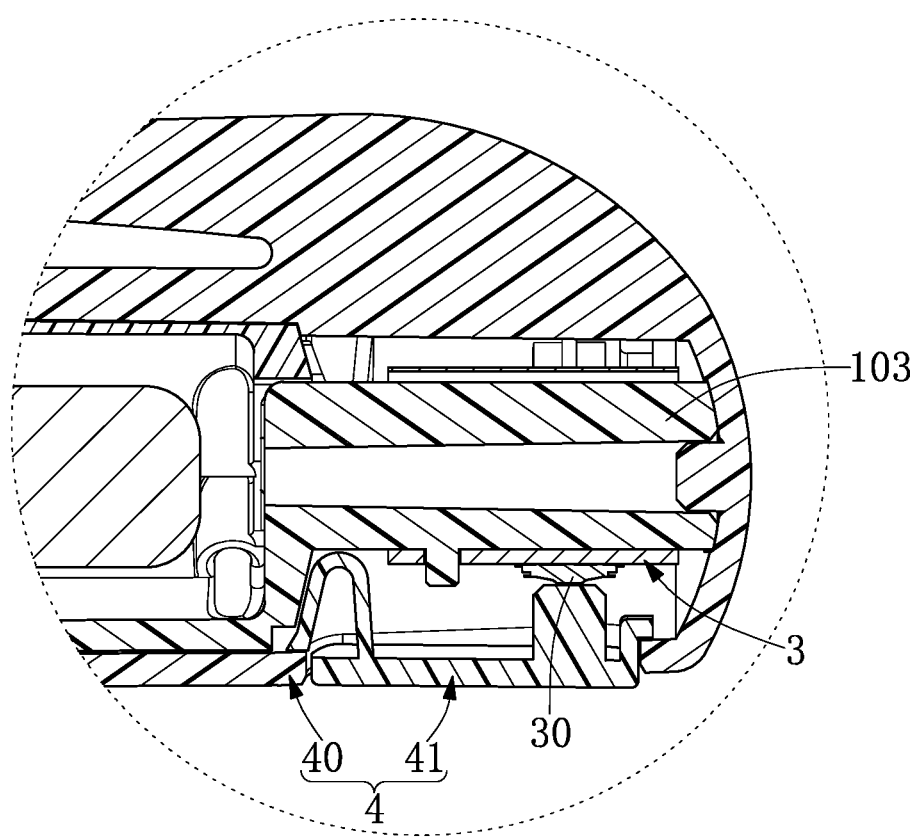
FIG. 4 is a magnified view of part IV of FIG. 3.
Figure 5:
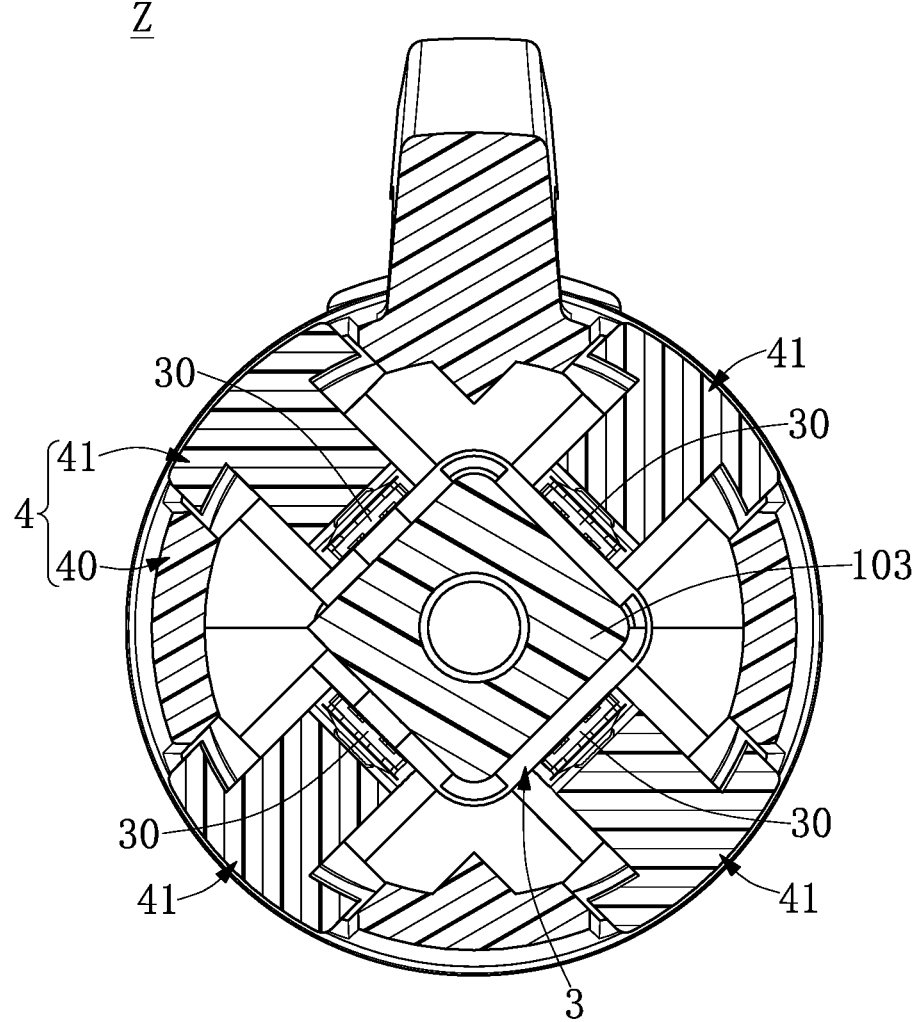
FIG. 5 is a sectional view taken along line V-V of FIG. 1.
Figure 6:
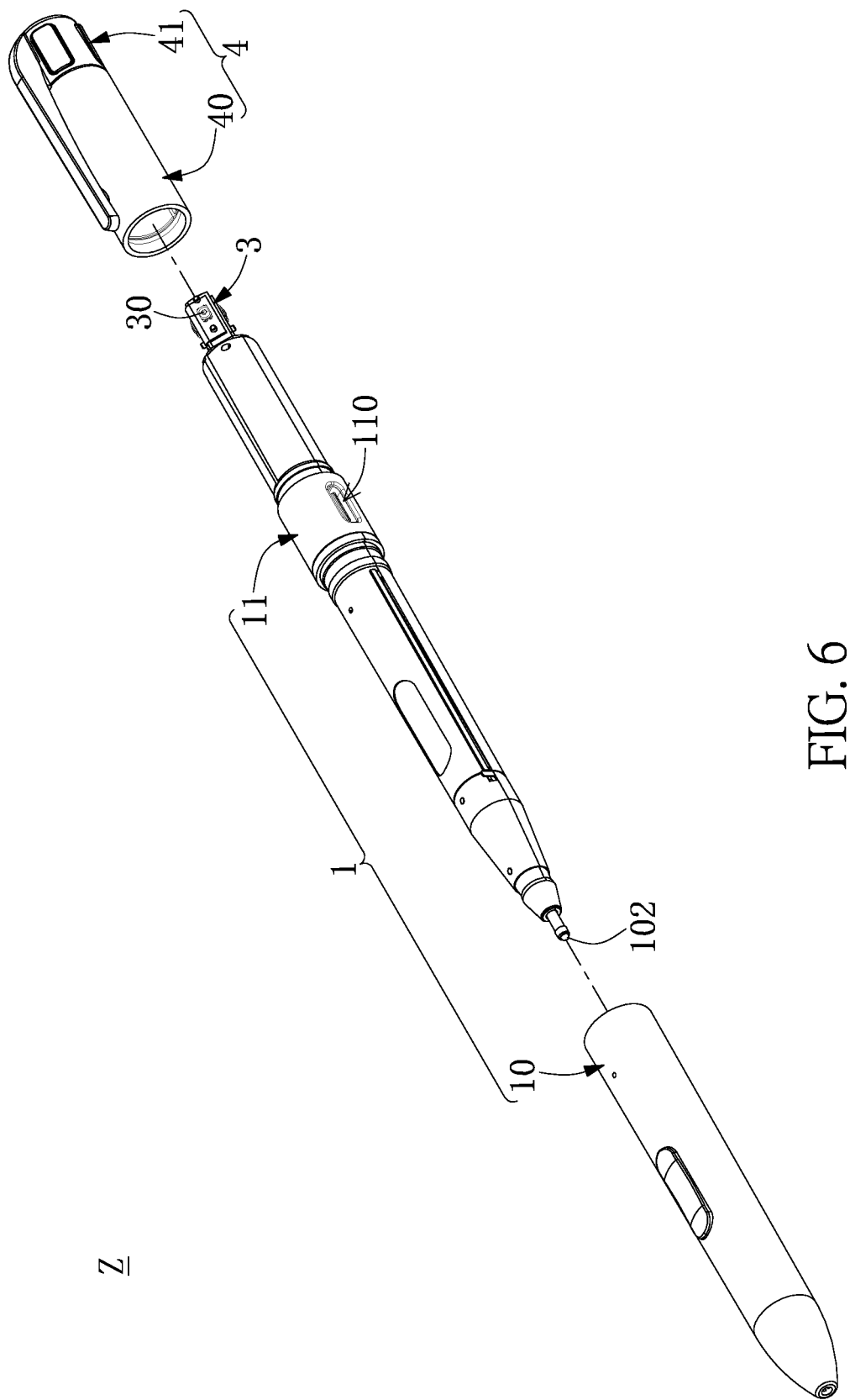
FIG. 6 is a first partial exploded view of the stylus structure according to the first embodiment of the present disclosure.
Figure 7:
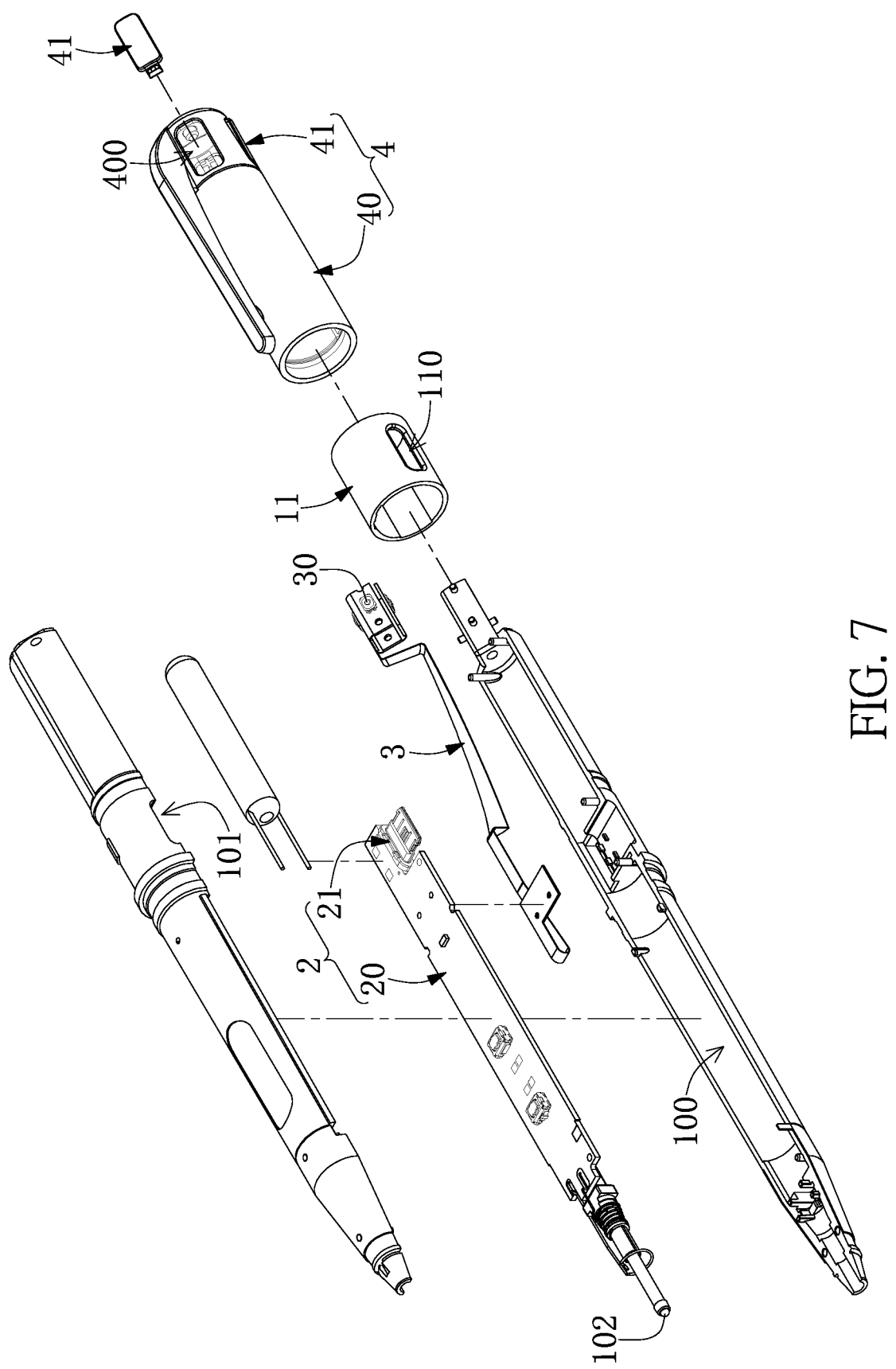
FIG. 7 is a second partial exploded view of the stylus structure according to the first embodiment of the present disclosure.
Figure 8:
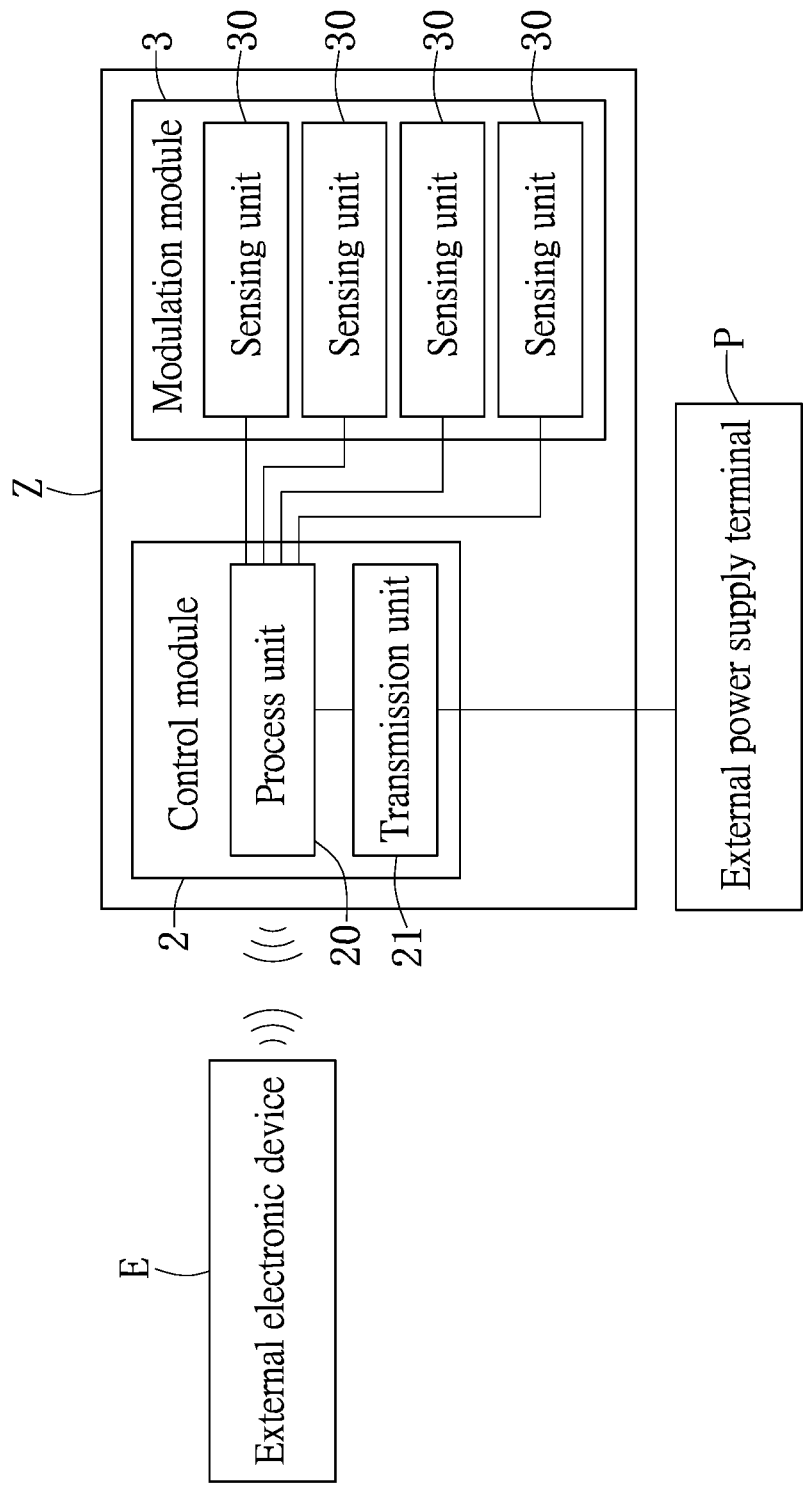
FIG. 8 is a functional block diagram of the stylus structure according to the first embodiment of the present disclosure.
Figure 9:
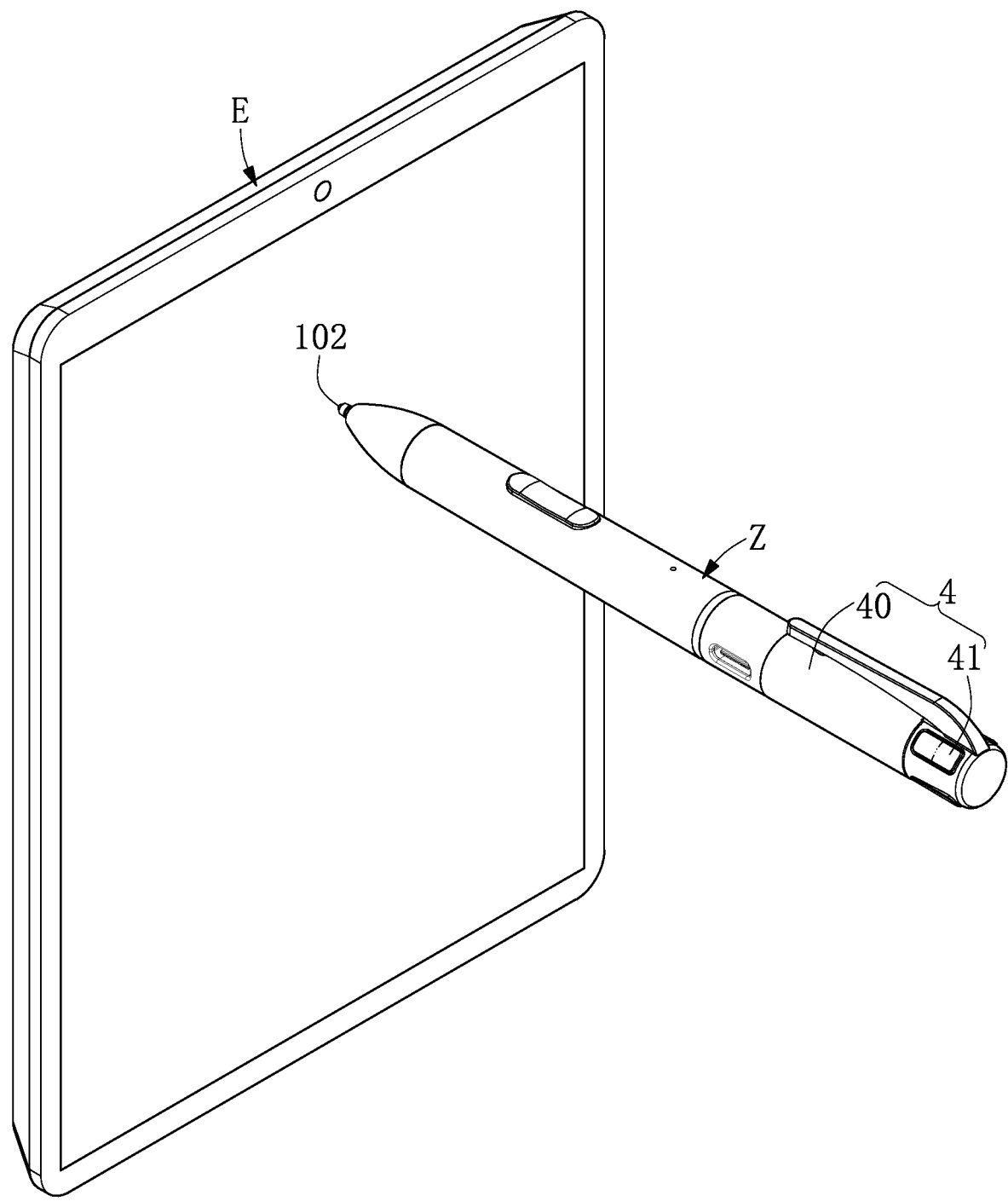
FIG. 9 is a schematic view of the stylus structure in operation according to the first embodiment of the present disclosure.

Referring to FIG. 1 to FIG. 9, FIG. 1 to FIG. 3 and FIG. 6 to FIG. 8 are a first perspective view, a second perspective view, a partial sectional view, a first partial exploded view, a second partial exploded view, and a functional block diagram of a stylus structure according to a first embodiment of the present disclosure. FIG. 4 is a magnified view of part IV of FIG. 3, FIG. 5 is a sectional view taken along line V-V of FIG. 1, and FIG. 9 is a schematic view of the stylus structure in operation according to the first embodiment of the present disclosure. A stylus structure Z is provided in the first embodiment of the present disclosure. The stylus structure Z includes a main body module 1, a control module 2, a modulation module 3, and a cover module 4. The main body module 1 includes a stylus case unit 10 and a movable unit 11. An accommodating space 100 is formed inside the stylus case unit 10, an inner opening 101 being in spatial communication with the accommodating space 100 is formed on a body of the stylus case unit 10, a touch control member 102 is disposed at an end of the stylus case unit 10, and a supportive part 103 is disposed at another end of the stylus case unit 10. The movable unit 11 is movably sleeved on the stylus case unit 10, in which an outer opening 110 is formed on the movable unit 11, and the inner opening 101 is exposed from the outer opening 110 or covered by the movable unit 11 through a rotation of the movable unit 11. The control module 2 is located in the accommodating space 100 and includes a process unit 20 and a transmission unit 21, in which the process unit 20 is communicatively connected to at least one external electronic device E, and the transmission unit 21 is electrically connected to the process unit 20 and corresponding to the inner opening 101. An end of the modulation module 3 is electrically connected to the process unit 20, and another end of the modulation module 3 is sleeved on the supportive part 103 and includes a plurality of sensing units 30. The cover module 4 includes a stylus cover unit 40 and a plurality of button units 41. The stylus cover unit 40 is detachably sleeved on the stylus case unit 10 and has a plurality of through holes 400 through a body of the stylus cover unit 40. Each one of the button units 41 is movably disposed to a corresponding through hole 400, and the plurality of button units 41 correspond to the plurality of sensing units 30. When the outer opening 110 corresponds to the inner opening 101 and the transmission unit 21 is electrically connected to an external power supply terminal P, the transmission unit 21 transmits an electrical power supplied by the external power supply terminal P to the process unit 20. In addition, when one of the button units 41 is pressed against a corresponding sensing unit 30, the corresponding sensing unit 30 generates a sensing signal and transmits the sensing signal to the process unit 20. According to the sensing signal, a color signal is sent to at least one of the external electronic devices E by the process unit 20.

Specifically, the stylus structure Z provided in the present embodiment includes a main body module 1, a control module 2, a modulation module 3, and a cover module 4. The inner opening 101 is formed on the body of the stylus case unit 10, and the inner opening 101 through the body of the stylus case unit 10 and communicates with the accommodating space 100. The touch control member 102 can be a touch structure of a front end of a common stylus. The movable unit 11 can be a ring structure. The process unit 20 can be a circuit board having processing components, and the transmission unit 21 can be a TYPE-C interface connection port. However, the present disclosure is not limited thereto. The process unit 20 can communicatively connect at least one of the external electronic devices E, and the external electronic devices E can be a tablet computer or a smart phone but is not limited thereto.

In addition, the modulation module 3 can be partially in the accommodating space 100, in which, the modulation module 3 can be a flexible circuit board, and the sensing unit 30 can be a common sensing component or a common switch component. However, the present disclosure is not limited thereto. The stylus cover unit 40 is detachably sleeved on the other end of the stylus case unit 10. In the present embodiment, the amount of the button units 41 is four, but is not limited thereto. In practice, the amount of the button unit 41 can be at least two, and the amount of the button unit 41 corresponds to the amount of the sensing unit 30. Furthermore, each one of the button units 41 is of a color, and the colors are different from each other. For example, the colors of the four button units 41 can respectively be black, blue, red, and green, but the colors are not limited thereto.

Therefore, when a user operates the external electronic device E with the stylus structure Z, if a color of the line to be drawn on the external electronic device Z requires changing, the user can press the button unit 41 of the desired color, so that the pressed button unit 41 is pressed against the corresponding sensing unit 30, and the corresponding sensing unit 30 can generate a sensing signal (e.g., a sensing signal including red code or a specific code). After receiving the sensing signal, the process unit 20 sends a color signal including a red definition to the external electronic device E. So that, when the user operates the external electronic device E through the stylus structure Z, the color of the line or text drawn is displayed in red. Otherwise, the user can also press the button unit 41 of the desired color to change the color during or before use. In other words, the process unit 20 generates different color signals according to the sensing signal generated by the different sensing unit 30.

In addition, the user can also rotate the movable unit 11 so that the outer opening 110 of the movable unit 11 corresponds in position to the inner opening 101 (as shown in FIG. 1). Then, the transmission unit 21 can be electrically connected to the external power supply terminal P (e.g., a socket connected to a grid or a power bank, but not limited thereto) through a transmission cable or other transmission components. Subsequently, the transmission unit 21 receives the electrical power supplied from the external power supply terminal P to supply the electrical power required for the operation of the process unit 20. Otherwise, when the user is not using the transmission unit 21, the movable unit 11 can be rotated to misalign the outer opening 110 with the inner opening 101 (as shown in FIG. 2), so that the movable unit 11 can cover the inner opening 101 and the transmission unit 21.

Second Embodiment

Figure 10:
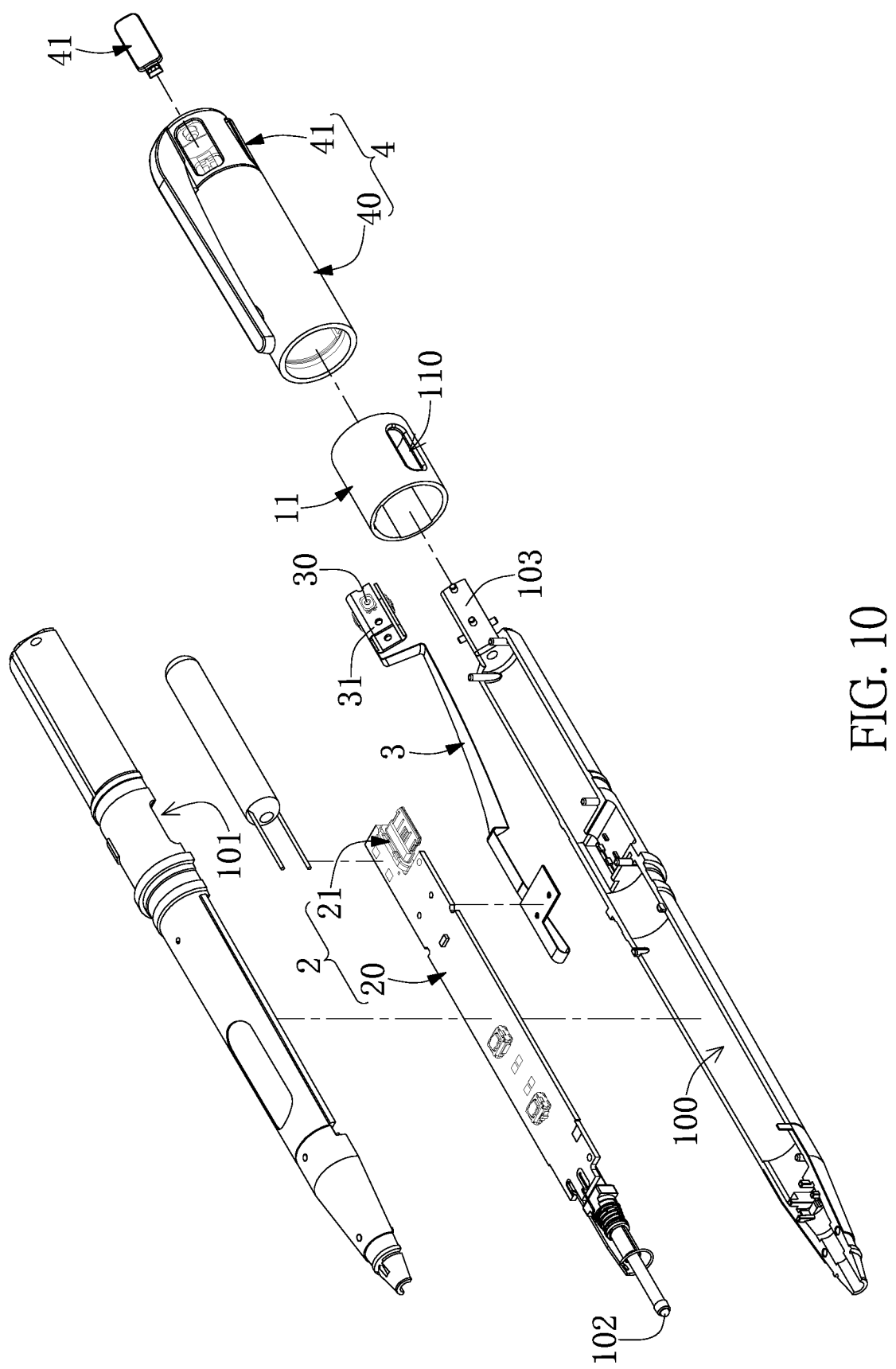
FIG. 10 is a partial exploded view of a stylus structure according to a second embodiment of the present disclosure.
Figure 11:
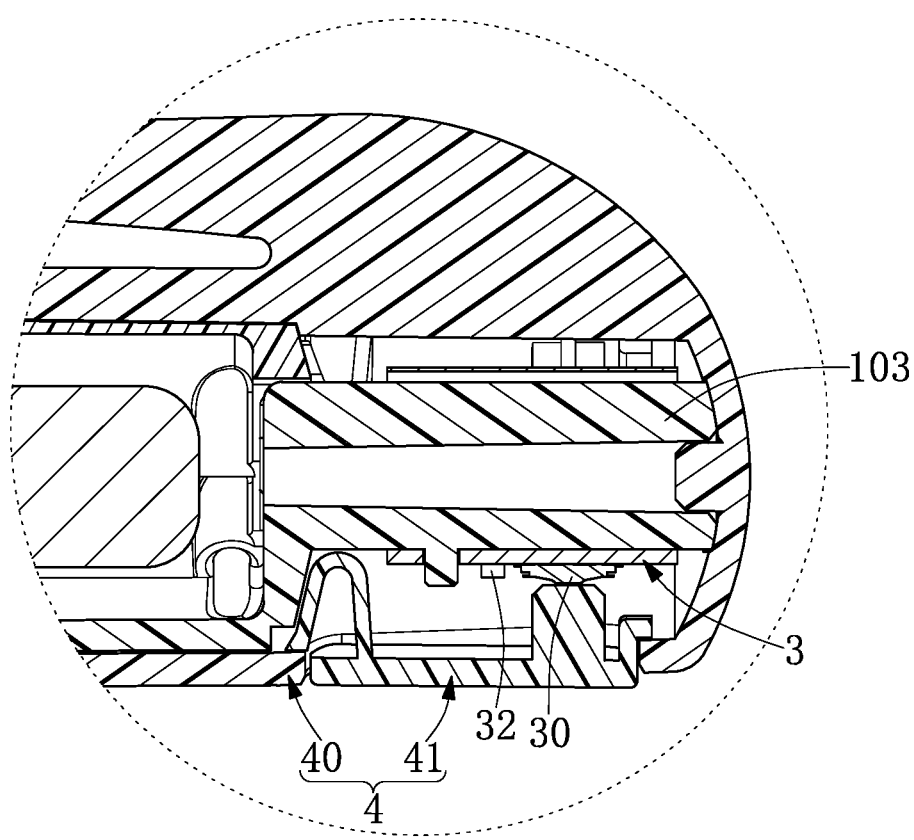
FIG. 11 is a partial sectional view of the stylus structure according to the second embodiment of the present disclosure.
Figure 12:
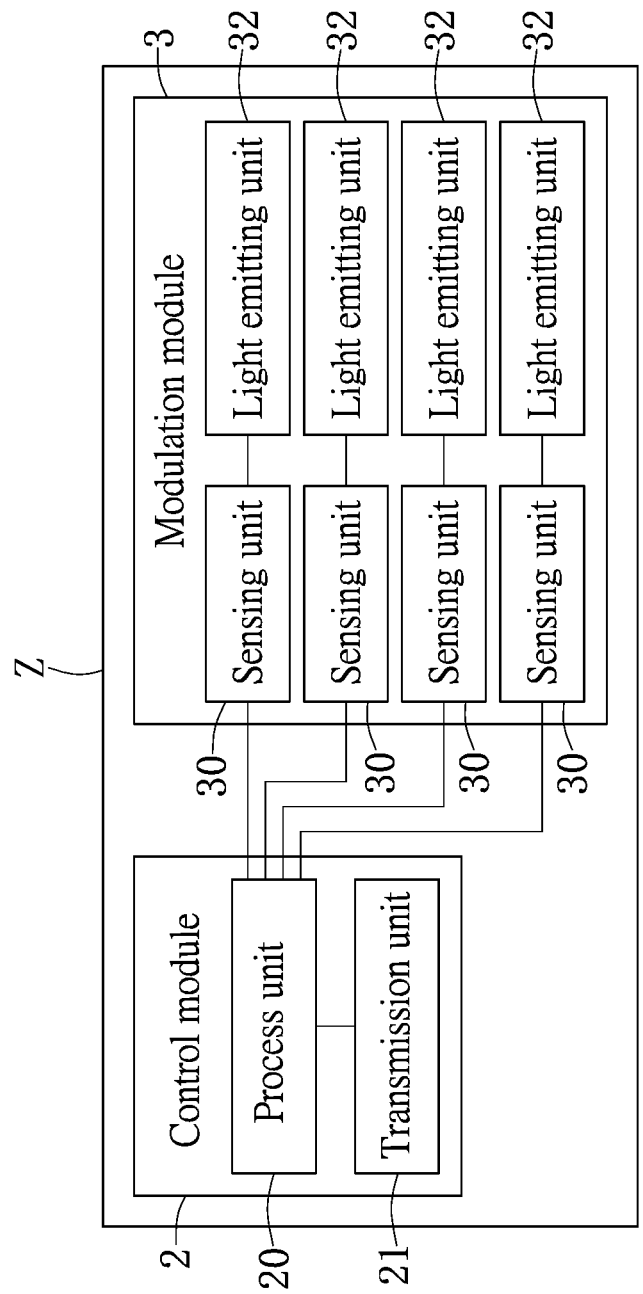
FIG. 12 is a functional block diagram of the stylus structure according to the second embodiment of the present disclosure.

Referring to FIG. 10 to FIG. 12, which are a partial exploded view, a partial sectional view, and a functional block diagram of a stylus structure according to a second embodiment of the present disclosure, and are to be read in conjunction with FIG. 1 to FIG. 9. In which, FIG. 11 corresponds to part IV of FIG. 3. In the stylus structure Z of the present embodiment, the operation mechanisms of the same components and those of the stylus structure Z of the first embodiment are similar, and descriptions thereof will be omitted herein. It should be noted that, in the present embodiment, a positioning part 31 can be disposed on the other end of the modulation module 3, the positioning part is detachably sleeved on the supportive part 103, and the plurality of sensing units 30 are disposed on the positioning part 31. In addition, the shape of the supportive part 103 is a polygonal column or circular cylinder, and the positioning part 31 corresponds to the shape of the supportive part 103.

For instance, the positioning part 3 can be formed at the other end of the modulation module 3, the plurality of sensing units 30 can be disposed on the positioning part 31, and the positioning part 31 corresponds to the shape of the supportive part 103.

In addition, in another embodiment, at least two sensing units 30 can be disposed on each side of the positioning part 31, and the color codes assigned in the at least two sensing units 30 are different from each other. Furthermore, referring to FIG. 5 and FIG. 9, the positioning part 31 has four sides, two sensing units 30 can be disposed on each one of the four sides. The button unit 41 can be divided into two parts, each part corresponds to one of the sensing units 30. For instance, two sensing units 30 are disposed on one side of the positioning part 31, and the two sensing units 30 are defined to be red and black, respectively. So that, the user can press a left half part or a right half part of the button unit 41 to perform color switching. Therefore, in the present disclosure, the user is provided with more color choices without increasing the volume of the stylus structure Z. For instance, each button unit 41 allows the user to select two colors, so that 8 color options are provided to the user by disposing four button units 41. However, the present disclosure is not limited thereto. Furthermore, the modulation module 3 can further include a plurality of light emitting units 32 corresponding to each one of the sensing units 30. The plurality of button units 41 are made by a transparent material, and each one of the light emitting units 32 emits light when being pressed by the corresponding sensing unit 30.

For example, in the present disclosure, the plurality of button units 41 can be made by the transparent material, and the modulation module 3 can further include the plurality of light emitting units 32 (e.g., light emitting diode). Each one of the light emitting units 32 corresponds to one of the sensing units 30, and is disposed on the positioning part 31. Furthermore, the light emitting unit 32 can be electrically connected to the sensing unit 30, process unit 20, or both. Therefore, when the user presses one of the sensing units 30, the light emitting unit 32 corresponding to the pressed sensing unit 30 generates a light beam with the corresponding color, for instance, emitting a red light beam to remind the user the color has been switched to red.

Third Embodiment

Figure 13:
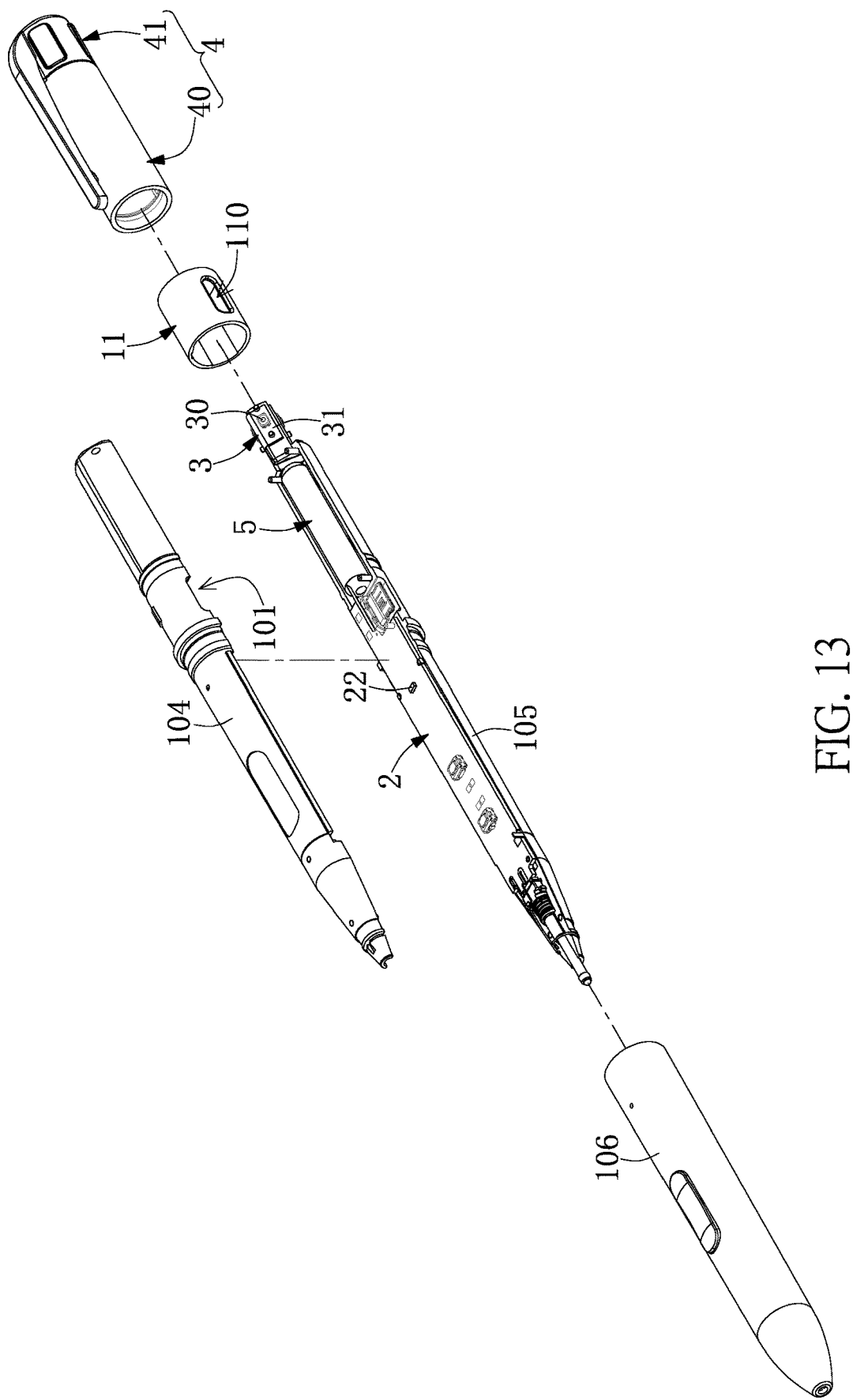
FIG. 13 is a partial exploded view of a stylus structure according to a third embodiment of the present disclosure
Figure 14:
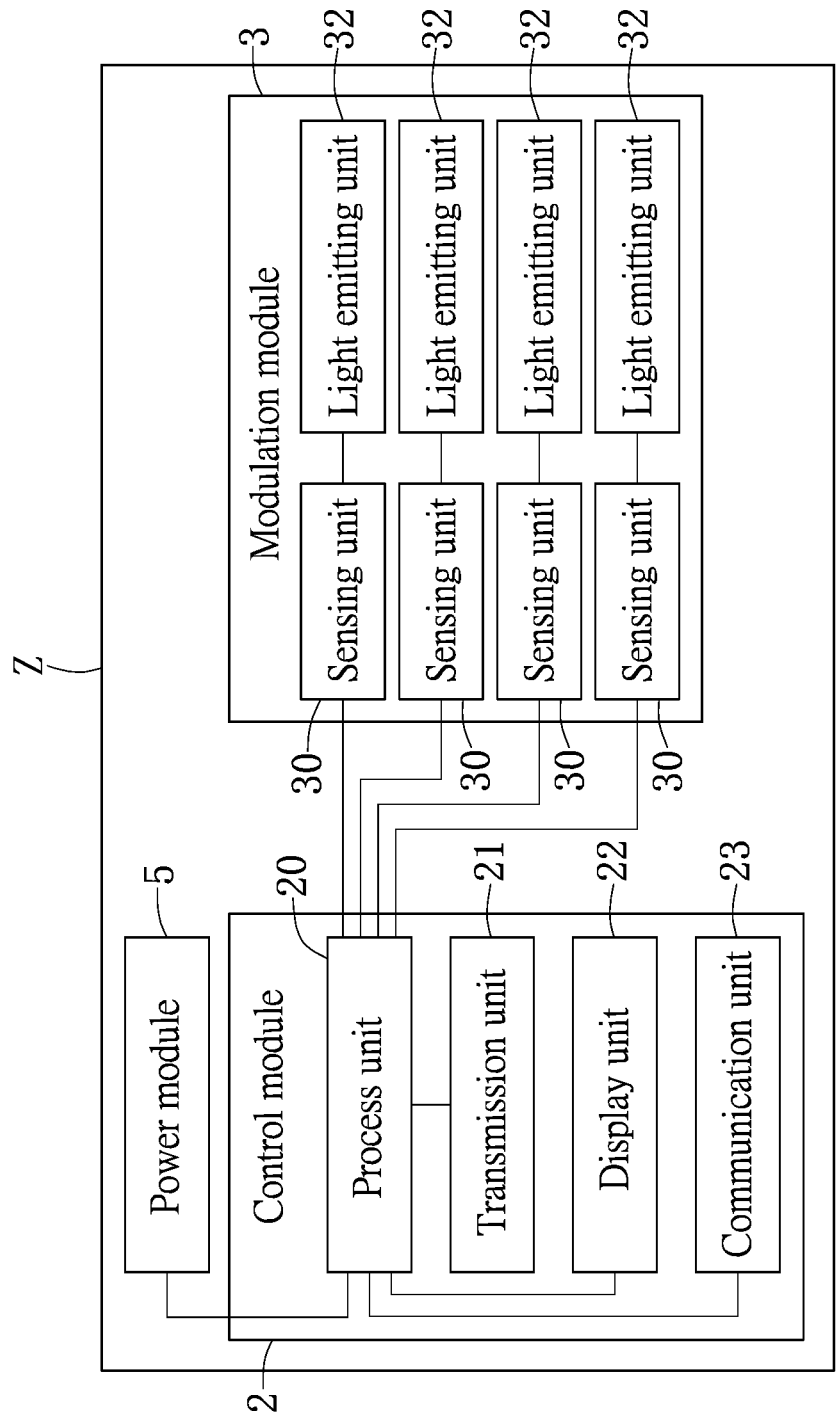
FIG. 14 is a functional block diagram of the stylus structure according to the third embodiment of the present disclosure.

Referring to FIG. 13 and FIG. 14, which are respectively a partial exploded view and a functional block diagram of a stylus structure according to a third embodiment of the present disclosure, and are to be read in conjunction with FIG. 1 to FIG. 12. In the stylus structure Z of the present embodiment, the operation mechanisms of the same components and those of the stylus structure Z of the foregoing embodiments are similar, and descriptions thereof will be omitted herein. It should be noted that, in the present embodiment, the stylus structure Z can further include a power module 5 located in the accommodating space 100. The power module 5 is electrically connected to the process unit 20 or the transmission unit 21. The power module 5 supplies the electrical power to the process unit 20, and the transmission unit 21 transmits the electrical power supplied by the external power supply terminal P to the power module 5.

For example, the power module 5 can be a rechargeable battery but is not limited thereto. So that, the power module 5 can supply the electrical power required for the operation of the process unit 20 or the components of the stylus structure Z. In addition, when the transmission unit 21 is electrically connected to the external power supply terminal P, the external power supply terminal P can charge the power module 5 as well.

Furthermore, the control module 2 further includes a display unit 22 exposed from the stylus case unit 10 and electrically connected to the process unit 20. A display message is generated by the display unit 22 when the process unit 20 is communicatively connected to at least one of the external electronic devices E or when the transmission unit 21 transmits the electrical power to the power module 5. For example, the display unit 22 can be a light emitting diode but is not limited thereto. Therefore, when the process unit 20 successfully communicates with the external electronic device E, when the electrical power supplied by the transmission unit 21 is transmitted to the power supply module 5 to charge the power supply module 5, or when the power supply module 5 is fully charged, the display unit 22 can be used to display different display messages (e.g., different light beams) to remind the user of the operating status of the stylus structure Z.

In addition, the control module 2 can further include a communication unit 23 electrically connected to the process unit 20. The process unit 20 can send the color signal to at least one of the external electronic device E through the communication unit 23. For example, the communication unit 23 can be a Bluetooth communication module or other communication modules. Therefore, the stylus structure Z can communicatively connect the external electronic device Z through the communication unit 23, so that the signal generated by the process unit 20 can be sent to the external electronic device E through the communication unit 23.

Furthermore, the stylus case unit 10 can include an upper body frame 104 and a lower body frame 105. The upper body frame 104 is detachably jointed with the lower body frame 105, and the accommodating space 100 is formed therebetween. The touch control member 102 is located at an end of the upper body frame 104 and also at an end of the lower body frame 105, the supportive part 103 is disposed at the other end of the lower body frame 105, and the stylus cover unit 40 is detachably sleeved on the upper body frame 104 and the lower body frame 105. In addition, the stylus case unit 10 further includes a stylus cap member 106 detachably sleeved on the upper body frame 104 and the lower body frame 105.

For instance, when assembling the stylus structure Z, the upper body frame 104 and the lower body frame 105 can be joined together first, and then the stylus cap member 106 is sleeved on the upper body frame 104 and the lower body frame 105, and the movable unit 11 is sleeved on the upper body frame 104 and the lower body frame 105. In the end, the pen cover unit 40 is sleeved on the upper body frame 104 and the lower body frame 105.

However, the foregoing embodiments are merely certain practicable embodiments and are not intended to limit the present disclosure.

Beneficial Effects of Embodiments

In conclusion, one of the beneficial effects of the present disclosure is that the stylus structure Z provided in the present disclosure can achieve a color switch function through the aspects of "an accommodating space 100 is formed in a stylus case unit 10, an inner opening 101 being in spatial communication with the accommodating space 100 is formed on a body of the stylus case unit 10, a touch control member 102 is disposed at an end of the stylus case unit 10, and a supportive part 103 is disposed at another end of the stylus case unit 10", "a movable unit 11 is movably sleeved on the stylus case unit 10, an outer opening 110 is formed on the movable unit 11, and the movable unit 11 makes the inner opening 101 exposed by the outer opening 110 or covers the inner opening 101 by the movable unit 11 through a rotating action", "a control module 2 located in the accommodating space 100 includes a process unit 20 and a transmission unit 21, in which the process unit 20 is communicatively connected to at least one external electronic device E, and the transmission unit 21 is electrically connected to the process unit 20 and corresponding to the inner opening 101", "an end of an modulation module 3 is electrically connected to the process unit 20, and another end of the modulation module 3 is sleeved on the supportive part 103 and includes a plurality of sensing units 30", "a cover module 4 includes a stylus cover unit 40 and a plurality of button units 41, in which the stylus cover unit 40 is detachably sleeved on the stylus case unit 10 and has a plurality of through holes 400 through a body of the stylus cover unit 40; each one of the button units 41 is movably disposed to a corresponding through hole 400, and the plurality of button units 41 correspond to the plurality of sensing units 30", "when the outer opening 110 corresponds to the inner opening 101 and the transmission unit 21 is electrically connected to an external power supply terminal P, the transmission unit 21 transmits an electrical power supplied by the external power supply terminal P to the process unit 20" and "when one of the button units 41 is pressed against a corresponding sensing unit 30, the corresponding sensing unit 30 generates a sensing signal and transmits the sensing signal to the process unit 20, and a color signal is sent to at least one of the external electronic devices E by the process unit 20 according to the sensing signal".

Furthermore, the stylus structure Z provided in the present disclosure through the foregoing aspects can provide the user with better experiences when a color of the line to be drawn requires changing. In addition, the structure of the movable unit 11 is configured in a way that using or hiding the transmission unit 21 is convenient for the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A stylus structure, comprising:
a main body module including:
a stylus case unit having an accommodating space formed therein, an inner opening being in spatial communication with the accommodating space formed on a body of the stylus case unit, a touch control member disposed at an end of the stylus case unit, and a supportive part disposed at another end of the stylus case unit; and
a movable unit movably sleeved on the stylus case unit, wherein an outer opening is formed on the movable unit, and the inner opening is exposed from the outer opening or covered by the movable unit through a rotation of the movable unit;
a control module located in the accommodating space including a process unit and a transmission unit, wherein the process unit is communicatively connected to at least one external electronic device, and the transmission unit is electrically connected to the process unit and corresponds to the inner opening;
a modulation module wherein an end of the modulation module is electrically connected to the process unit, and another end of the modulation module is sleeved on the supportive part and includes a plurality of sensing units; and
a cover module including a stylus cover unit and a plurality of button units, wherein the stylus cover unit is detachably sleeved on the stylus case unit and has a plurality of through holes through a body of the stylus cover unit, and wherein each one of the button units is movably disposed at a corresponding through hole, and the plurality of button units correspond to the plurality of sensing units;
wherein, when the outer opening corresponds to the inner opening and the transmission unit is electrically connected to an external power supply terminal, the transmission unit transmits an electrical power supplied by the external power supply terminal to the process unit, and wherein when one of the button units is pressed against a corresponding one of the sensing units, the corresponding sensing unit generates a sensing signal and transmits the sensing signal to the process unit, and a color signal is sent to at least one of the external electronic devices by the process unit according to the sensing signal.

2. The stylus structure according to claim 1, wherein the stylus case unit includes a upper body frame and a lower body frame, wherein the upper body frame and the lower body frame are detachably jointed together and form the accommodating space therebetween, the touch control member is located at an end of the upper body frame and at an end of the lower body frame, and the supportive part is disposed on another end of the lower body frame, and wherein the movable unit is movably sleeved on the upper body frame and the lower body frame, and the stylus cover unit is detachably sleeved on the upper body frame and the lower body frame.

3. The stylus structure according to claim 2, wherein stylus case unit further includes a stylus cap member detachably sleeved on the upper body frame and the lower body frame.

4. The stylus structure according to claim 1, wherein the another end of the modulation module has a positioning part detachably sleeved on the supportive part, and the plurality of sensing units are disposed on the positioning part.

5. The stylus structure according to claim 4, wherein a shape of the supportive part is a polygonal column or circular cylinder, and the positioning part corresponds to the shape of the supportive part.

6. The stylus structure according to claim 1, wherein the process unit generates different color signals according to the sensing signal generated by different ones of the sensing units.

7. The stylus structure according to claim 1, wherein the modulation module has a plurality of light emitting units corresponding to each one of the sensing units, the plurality of button units are made by a transparent material, and each one of the light emitting units emits light when being pressed by the corresponding sensing unit.

8. The stylus structure according to claim 1, further comprising a power module located in the accommodating space, wherein the power module is electrically connected to the process unit or the transmission unit and supplies power for the process unit, and wherein the transmission unit transmits the electrical power supplied by the external power supply terminal to the power module.

9. The stylus structure according to claim 8, wherein the control module further includes a display unit exposed from the stylus case unit and electrically connected to the process unit, and a display message is generated by the display unit when the process unit is communicatively connected to at least one of the external electronic devices or the transmission unit transmits the electrical power to the power module.

10. The stylus structure according to claim 1, wherein the control module further includes a communication unit electrically connected to the process unit, and wherein the color signal is sent to at least one of the external electronic devices by the process unit through the communication unit.

* * * * *